(12) United States Patent
Yannuzzi et al.

(10) Patent No.: US 12,223,463 B2
(45) Date of Patent: Feb. 11, 2025

(54) RELIABLE OBSERVABILITY IN CONTROL TOWERS BASED ON SIDE-CHANNEL QUERIES

(71) Applicant: Cisco Technology, Inc., San Jose, CA (US)

(72) Inventors: Marcelo Yannuzzi, Vufflens-La-Ville (CH); Joel Abraham Obstfeld, Bushey (GB)

(73) Assignee: Cisco Technology, Inc., San Jose, CA (US)

( * ) Notice: Subject to any disclaimer, the term of this patent is extended or adjusted under 35 U.S.C. 154(b) by 20 days.

(21) Appl. No.: 17/524,909

(22) Filed: Nov. 12, 2021

(65) Prior Publication Data

US 2023/0153746 A1    May 18, 2023

(51) Int. Cl.
*G06Q 10/0833*    (2023.01)
*G06F 21/60*    (2013.01)

(52) U.S. Cl.
CPC ......... *G06Q 10/0833* (2013.01); *G06F 21/60* (2013.01)

(58) Field of Classification Search
CPC ............................ G06Q 10/0833; G06F 21/60
See application file for complete search history.

(56) References Cited

U.S. PATENT DOCUMENTS

| | | | | |
|---|---|---|---|---|
| 8,625,575 | B1 * | 1/2014 | Aly | H04W 40/28 370/254 |
| 10,627,244 | B1 * | 4/2020 | Lauka | G01C 21/3623 |
| 2017/0359194 | A1 * | 12/2017 | Cibaud | H04L 12/6418 |
| 2018/0268348 | A1 * | 9/2018 | Guan | G06Q 10/083 |
| 2018/0339865 | A1 * | 11/2018 | Schroader | G06V 20/52 |
| 2020/0250683 | A1 | 8/2020 | Padmanabhan et al. | |
| 2020/0259896 | A1 | 8/2020 | Sachs et al. | |
| 2020/0295919 | A1 | 9/2020 | Covaci et al. | |
| 2021/0182995 | A1 | 6/2021 | Cella et al. | |
| 2022/0067650 | A1 * | 3/2022 | Polo Filisan | H04L 67/12 |

FOREIGN PATENT DOCUMENTS

CN           112651830 A        4/2021

OTHER PUBLICATIONS

N. Patwari, Locating the nodes: cooperative localization in wireless sensor networks, 2005, p. 54-55 (Year: 2005).*
Hearn, et al., "Cybersecurity Considerations for Digital Twin Implementations", IIC Journal of Innovation, Nov. 2019, 7 pages, Industrial Internet Consortium.
Eckhart, et al., "Towards Security-Aware Virtual Environments for Digital Twins", CPSS '18: Proceedings of the 4th ACM Workshop on Cyber-Physical System Security, May 2018, pp. 61-72, Association for Computing Machinery.

* cited by examiner

*Primary Examiner* — Ibrahim N El-Bathy
(74) *Attorney, Agent, or Firm* — BEHMKE INNOVATION GROUP LLC; James M. Behmke; James J. Wong (57) ABSTRACT

In one embodiment, a control tower device obtains, first state information from sensing or reporting systems or devices at a particular location via a first communication channel. The control tower device makes, based on the first state information, an evaluation regarding the particular location using one or more digital twins representing one or more entities of the particular location. The control tower device obtains second state information from one or more trusted verifiers for the particular location via a second communication channel. The control tower device verifies, based on the second state information, the evaluation regarding the particular location.

16 Claims, 6 Drawing Sheets

RELIABLE OBSERVABILITY IN CONTROL TOWERS BASED ON SIDE-CHANNEL QUERIES

TECHNICAL FIELD

The present disclosure relates generally to computer networks, and, more particularly, to reliable observability in control towers based on side-channel queries.

BACKGROUND

In the supply chain management and logistics, control tower systems are tools that provide centralized data-gathering, analytics, and visualization functions by obtaining information from a range of different sources, logically organizing and processing the information, then presenting the information to operators, for example, of a supply chain. The operators, using control tower systems, are able to gain visibility into the execution and operation of processes and procedures in the "field," where various components, elements, etc. of a particular supply chain may be located. The operators may also make decisions that affect functions, operations, etc. of the supply chain based on the information presented to them.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a control tower device obtains, first state information from sensing or reporting systems or devices at a particular location via a first communication channel. The control tower device makes, based on the first state information, an evaluation regarding the particular location using one or more digital twins representing one or more entities of the particular location. The control tower device obtains second state information from one or more trusted verifiers for the particular location via a second communication channel. The control tower device verifies, based on the second state information, the evaluation regarding the particular location.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
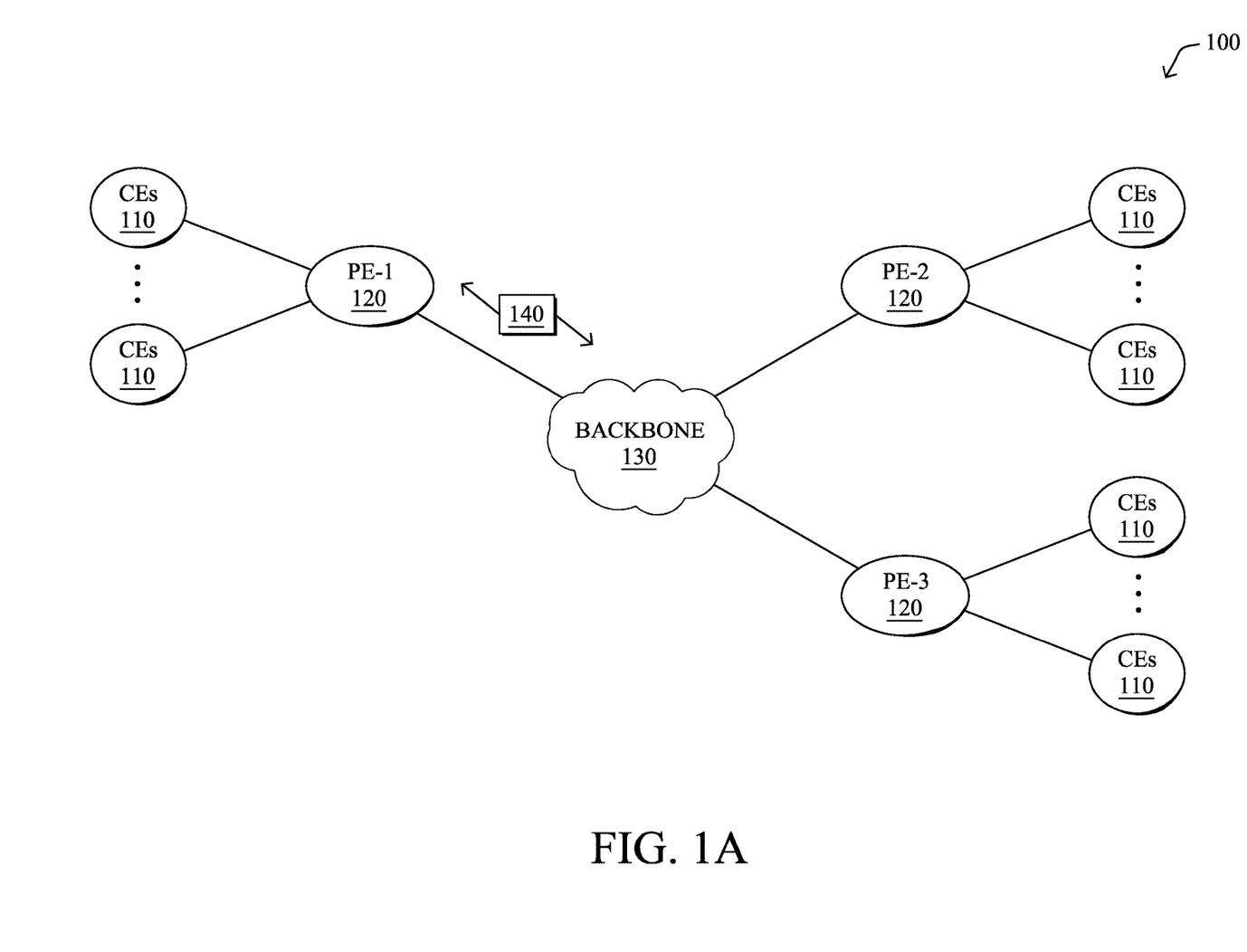
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
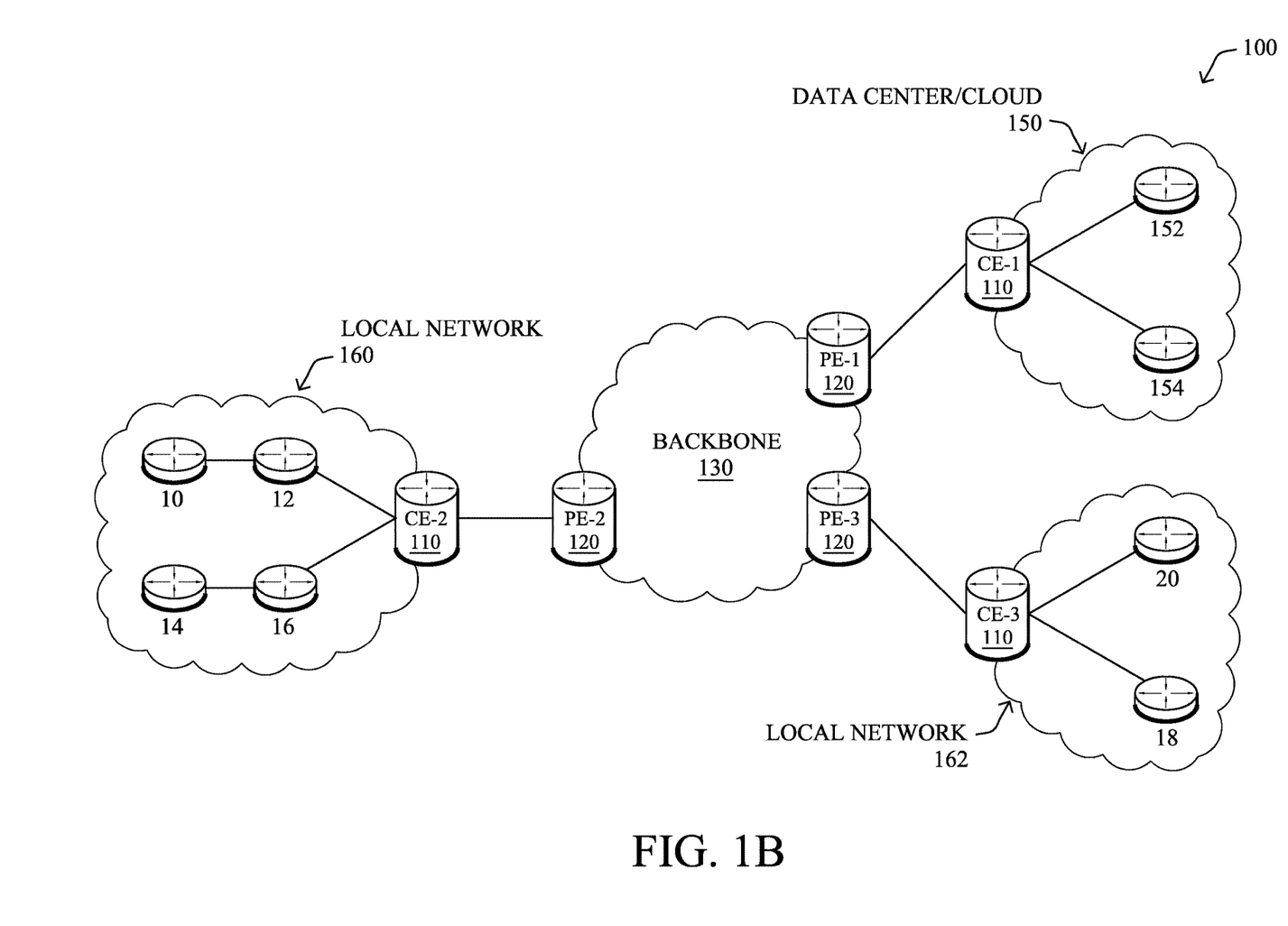

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
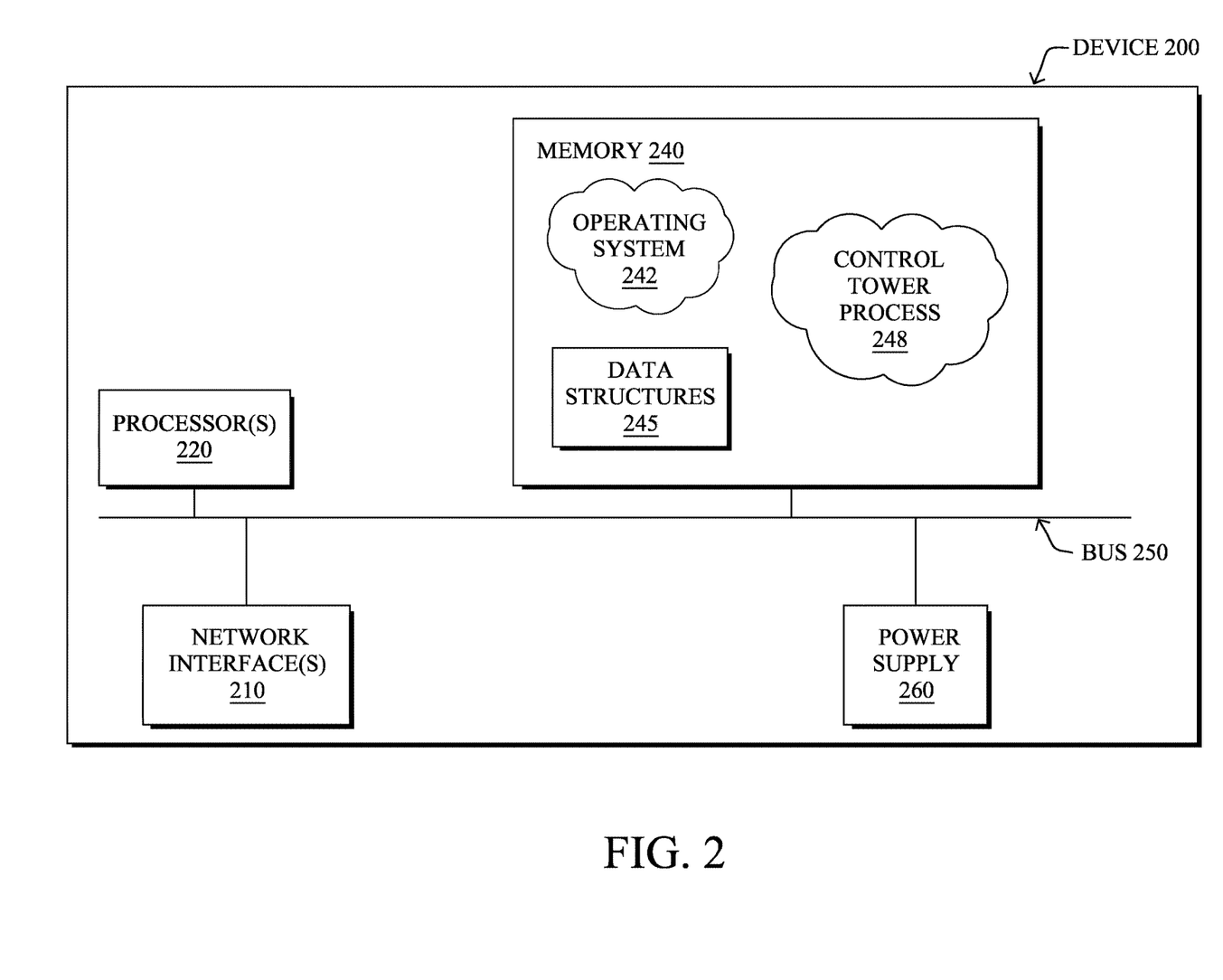
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise control tower process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, control towers (CTs) have become core tools for management and operation of complex systems, for example, in supply chain management and logistics. Control tower systems act to provide a "single-pane-of-glass" function to stakeholders of supply chains; in other words, they logically centralize and present data, from which decisions can be made based on (near) real-time information. Specifically, this is achieved by control tower systems taking in information from a range of different sources then providing operators (of the stakeholders) visibility into the execution and operation of processes and procedures in the "field" (e.g., various parts of within and on the periphery of supply chains). With such information, operators can monitor, manage, and make decisions based on the received information with the goal of maximal performance and efficiency.

As control tower systems have advanced, the concept of a digital twin has been incorporated. A digital twin is a digital representation of part or a whole physical system, for example, a moisture sensor, an individual warehouse, seaport/airport terminal or vehicles, or an entire supply chain, where the digital representation is obtained and constructed from information, data, etc. from various components of the physical system. A digital twin may also be a digital representation of a physical object or process that is part of a larger physical system. Operations, modifications, etc. may be performed on the data that comprises a digital twin, such as process analysis, performance optimization, etc., and, in some cases, these changes performed on the digital twin may then be executed on corresponding physical elements (in some cases automatically and/or instantaneously).

However, because of control tower systems' increasing incorporation and reliance on digital twins, additional avenues of manipulation or attack surfaces are available for malicious activity, accidents, etc. That is, threat actors may look to target not only a physical system or information/data gathering mechanisms from it, but they may also target the information/data held within (or that makes up) a digital twin that represents the physical system. In some cases, these threat actors may determine that it is easier to compromise information/data, instead of the physical system itself.

Notably, if any part of the information that is used to construct a digital twin is purposely or accidentally compromised (e.g., by a threat actor), it is possible that an operator, at a control tower, may make an erroneous decision based on the compromised digital twin even though a corresponding physical system has not been breached. In another example, such alteration could lead to an automatically implemented unintended change to an actual supply chain that the digital twin represents. In either case of erroneous decision making or an automatic change, consequences may include economic and/or physical damage to components and parts of a supply chain itself, good or products along the supply chain being compromised and/or delayed, or even, potentially, lives of humans (that operate or work along the supply chain) being put at risk.

The ability to make reliable observations of the state of a complex system (e.g. a supply chain), thus, is key to the overall operation of the aforementioned control towers. If the information used to construct digital twins, which have been used more in more in control tower systems cannot be relied upon, then trust, in a technical sense, of entire control tower systems is diminished.

Reliable Observability in Control Towers

Based on Side-Channel Queries

The techniques herein introduce systems and methods for reliable observability in control towers based on side-channel queries. That is, trust in the information incorporated in digital twins presented to operators of control tower systems may be obtained or enhanced. In particular, the techniques herein combine a random selection of information (e.g., data) gathered by local verifier devices (e.g., that are within or part of a physical system monitored by a control tower system) and/or remote verifier devices (e.g., that are located outside a physical system monitored by a control tower system). The local verifier devices and remote verifier devices may both be queried, for example, via side-channels (i.e., over different communications and/or measurement methodologies than the physical system uses) to obtain the information. One or more consensus mechanisms may be applied to the information gathered by the devices to verify or determine whether information and/or data that is exposed to control tower systems (e.g., in the construction or updating of one or more digital twins) may be considered uncompromised and, therefore, "trusted" and relied upon. The techniques herein, therefore, build, maintain, and retain trust in control tower systems that incorporate digital twins, thereby increasing the level of assurance and reliability of such systems. In other words, by ensuring the trust of the information presented to operators of supply chains by control tower system, decisions to streamline processes or operations, predictions, simulations of what-if scenarios, etc. may each be protected from being undermined by threat actors or accidents.

Illustratively, the techniques described herein may be performed by hardware, software, and/or firmware, such as in accordance with control tower process 248, which may include computer executable instructions executed by the processor 220 (or independent processor of interfaces 210) to perform functions relating to the techniques described herein.

Specifically, according to various embodiments, a control tower device obtains, first state information from sensing or reporting systems or devices at a particular location via a first communication channel. The control tower device makes, based on the first state information, an evaluation regarding the particular location using one or more digital twins representing one or more entities of the particular location. The control tower device obtains second state information from one or more trusted verifiers for the particular location via a second communication channel. The control tower device verifies, based on the second state information, the evaluation regarding the particular location.

According to one or more embodiments of the disclosure, a control tower device obtains, first state information from one or more sensing or reporting devices at a particular location via a first communication channel. Information is fed into a software-based model known as a digital twin, the digital twin representing one or more sensing or reporting devices. The control tower device makes, based on the first state information held within the digital twin, an evaluation regarding the received information. The control tower device obtains second state information from one or more trusted verifiers for the sensing or reporting devices via a second communication channel. The control tower device employs a verification mechanism to validate the information received from sensing or reporting devices based on the second state information. The verification mechanism is intended to identify (and prevent) fraudulent or erroneous information from being injected into the control tower device.

Figure 3:
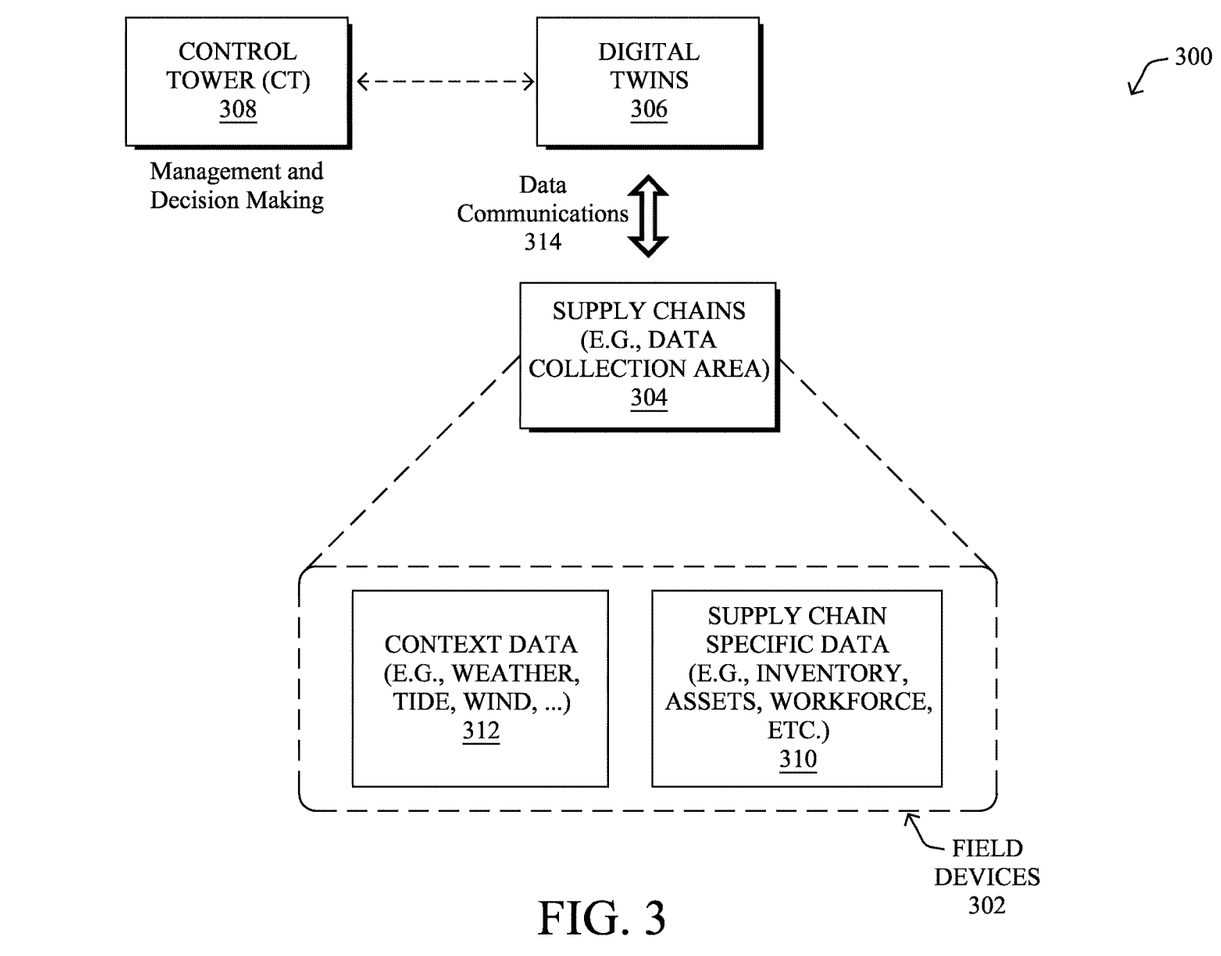
FIG. 3 illustrates an example architecture for reliable observability in control towers based on side-channel queries.

Operationally, FIG. 3 illustrates an example architecture 300 for reliable observability in control towers based on side-channel queries, according to various embodiments. The architecture 300 may comprise field devices 302 of supply chain 304 (or any other monitored physical system, logistics systems, etc.), one or more digital twins 306 that are virtual representations of supply chain 304, and control tower system 308 that implements control tower process 248.

Field devices 302 may comprise various types of types of physical sensors, devices, systems, and applications, for example, those described above, that may be implemented in supply chain 304 to obtain information from or about the "field" where supply chain 304 is located (e.g., from seaport terminals, airports, carriers/transport vehicles, warehouses, distribution centers, etc.). Of note, field devices 302 may comprise a sensor device configured to measure weight, time, humidity, air pressure, or the like of a good or location within supply chain 304. It is to be understood that the data or information obtained by field devices 302 may be needed not only to "execute" a specific task but also to "observe" its corresponding execution, anticipate and handle exceptions, analyze and streamline processes, etc. For instance, this data may be considered supply chain specific data 310 that is indicative of: a) the location of inventory that needs to be classified and moved; b) the assets required to move the inventory and their current location (e.g., pallets, forklifts, or autonomous mobile robots); and c) operators that should be involved in that task, etc. Field devices 302 may also obtain context data 312 regarding supply chain 304 that is indicative of external forces that may affect the execution of certain tasks and lead to deviations in the planning of operation of supply chain 304. For example, context data 312 may indicate weather conditions or the tide and wind in a seaport. Altogether, data (or state information) obtained by field devices 302 may be used to capture the state of supply chain 304, which, as is understood in the art, can be represented as S=[X]. In particular, the latter could be a vector, a matrix, or a set of vectors and matrixes combined as needed. Conventionally, data or information required to capture the state of the supply chain 304 may forwarded to a computing infrastructure or device (e.g., a backend system, device 200, etc.) using different types of communications infrastructure 314 to communicate (e.g., transmit, send, etc.) the data or information.

One or more digital twins 306 comprise a digital representation of supply chain 304 (or one or more physical systems). In particular, specific data 310 and context data 312 obtained by field devices 302 may be used to construct a digital twin of supply chain 304. Control tower system 308, may as described above, incorporate one or more digital twins 306 to present information to operators or stakeholders of supply chain 304, where the operators or stakeholders may manage and make decisions regarding supply chain 304 based on the observed state of the system.

It is to be understood that operation of supply chain 304 may face various threats from malicious (e.g., threat) actors who try to alter or compromise operation of state supply chain 304 observed by control tower system 308. In some cases, such actors may physically break into and enter facilities, premises, etc. in the "field" to alter and compromise physical elements of supply chain 304. This may be accomplished through physical damage that leads to the compromising of functionality of field devices 302 (either in data gathering ability or communications infrastructure accessibility). Both of these approaches may be more challenging or difficult than compromising one or more digital twins 306, for example, through cybersecurity, ransomware, etc. attacks. In each of these cases, one of the objectives of malicious (e.g., threat) actors may be to expose an untrue state S=[X'] to the control tower system 308, which differs from the actual state of the system, S=[X]. By exposing control tower system 308 to the untrue state, decision making, operations, etc. of supply chain 304 may be manipulated.

Figure 4:
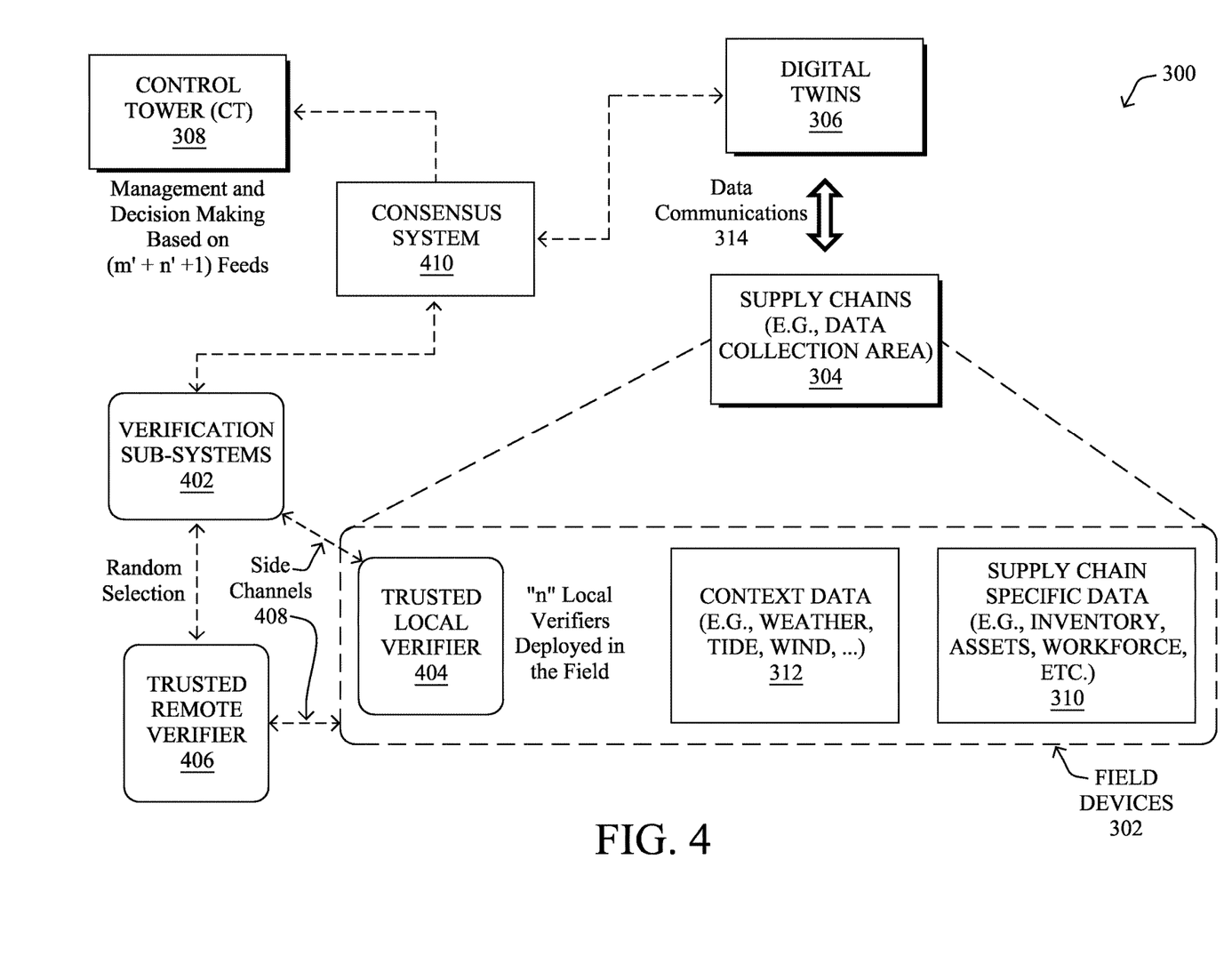
FIG. 4 illustrates additional details of the example architecture for reliable observability in control towers based on side-channel queries.

Turning now to FIG. 4, additional details of example architecture 300 for reliable observability in control towers based on side-channel queries is shown, according to various embodiments. In particular, one or more verification sub-systems 402 may be employed to leverage trusted local verifier devices 404 and/or trusted remote verifier devices 406 to verify whether one or more digital twins 306 have been compromised. Trusted local verifier devices 404 and remote verifier devices 406 may be, respectively, within or part of field devices 302 that monitor and obtain state information regarding operation of supply chain 304 or located outside of field devices 302. In other words, the verifier devices may belong either to the entity that owns or runs the local infrastructure of supply chain 304 or they might belong to a third-party. Similar to field devices 302, trusted local verifier devices 404 and remote verifier devices 406 may comprise a sensor device configured to measure weight, time, humidity, air pressure, or the like of a good or location.

As shown, information or data monitored by trusted local verifier devices 404 and remote verifier devices 406 may be obtained by one or more verification sub-systems 402 via side-channel communication paths 408 using, for example, queries, requests for information, etc. Notably, side-channel communication paths 408 may comprise communication channels that are not used by field devices 302 to communicate information to inform one or more digital twins 306 and/or control tower system 308, in particular, communications infrastructure 314. Specifically, side-channel communication paths 408 may be of a different communications technology type than communications infrastructure 314. Alternatively, side-channel communication paths 408 may be of the same type but inaccessible from one another.

Trusted local verifier devices 404 and remote verifier devices 406 are, generally, configured to provide state information, gathered independently, about supply chain 304 and its operating environment. For example, a verifier device may confirm context data 312, such as the weather conditions at a particular location using a range of different sensors and sources that may differ than that of field devices 302. In another example, where operators of control tower system 308 want to confirm a number of pallets ready to be shipped in a particular location, one or more verification sub-systems 402, by implementing a range of different sensors and sources, may confirm the number of pallets. In particular, a verifier device of trusted local verifier devices 404 may use video analytics to process video feeds from cameras to count the number of pallets present in a given area, while another verifier device of trusted local verifier devices 404 may use the data gathered from piezoelectric sensors in the pallets along with geofencing techniques in order to confirm the number of relevant pallets inside that area.

Additionally, a verifier device of remote verifier devices 406 (e.g., run by a third-party) may count the number of pallets ready to be shipped by analyzing images obtained from an unmanned aerial vehicle (UAV) system. One or more verification sub-systems 402, using of two or more different modalities to determine the number of "elements" present within the area, in addition to using side-channel communication paths 408 to convey the data and perform independent verification, increases the complexity of executing an attack against the data available to control tower system 308 (as well as one or more digital twins 306). Further, using (or implementing) multiple modalities increases the reliability of the information exposed to the control tower system 308 since the data has been presented by independent sources and through independent channels.

In one or more embodiments, one or more verification sub-systems 402 may be configured to query a random number of independent verifiers, for example, trusted local verifier devices 404 and/or remote verifier devices 406, instead of querying all of the verifier devices. Notably, this may be accomplished to reduce computational (or network) overhead, privacy concerns, etc. Results of the queries may be verified by one or more verification sub-systems 402 (e.g., by comparing information to one or more predetermined values, predicted states, etc.) by one or more verification sub-systems 402.

One or more verification sub-systems 402 may then send the verified results to consensus system 410 that is configured to apply one or more consensus mechanisms, heuristics, etc. to the verified results. In response to the verified results meeting a consensus, a state of supply chain 304 as represented by the digital twin 306 may be determined and sent to control tower system 308. Implementation of consensus system 410 ensures that that a single compromised data source and/or verifier device (e.g., trusted local verifier devices 404 or remote verifier devices 406) will be prevented from having its compromised information accepted as being correct. In other words, in order for an attack by a threat actor to be successful, a majority of the trusted local verifier devices 404 and remote verifier devices 406 will need to be compromised concurrently. In addition, it is to be understood that one or more discrepancies determined by consensus system 410 may be identified by control tower system 308 as a potential attack or vulnerability, missing information, and/or inaccuracies of field devices 302 of supply chain 304.

In one or more embodiments, it is to be understood that trusted local verifier devices 404 may be used by one or more verification sub-systems 402 to verify information reported by remote verifier devices 406. In turn, information from remote verifier devices 406 may be used by one or more verification sub-systems 402 to verify information by trusted local verifier devices 404. Further, it is contemplated that trusted local verifier devices 404 or remote verifier devices 406 may be implemented in multiple sensor and communications infrastructures, with the aim of providing reliable observability, end-to-end across multiple complex supply chains or logistics systems (e.g., a plurality of supply chain 304).

Figure 5:
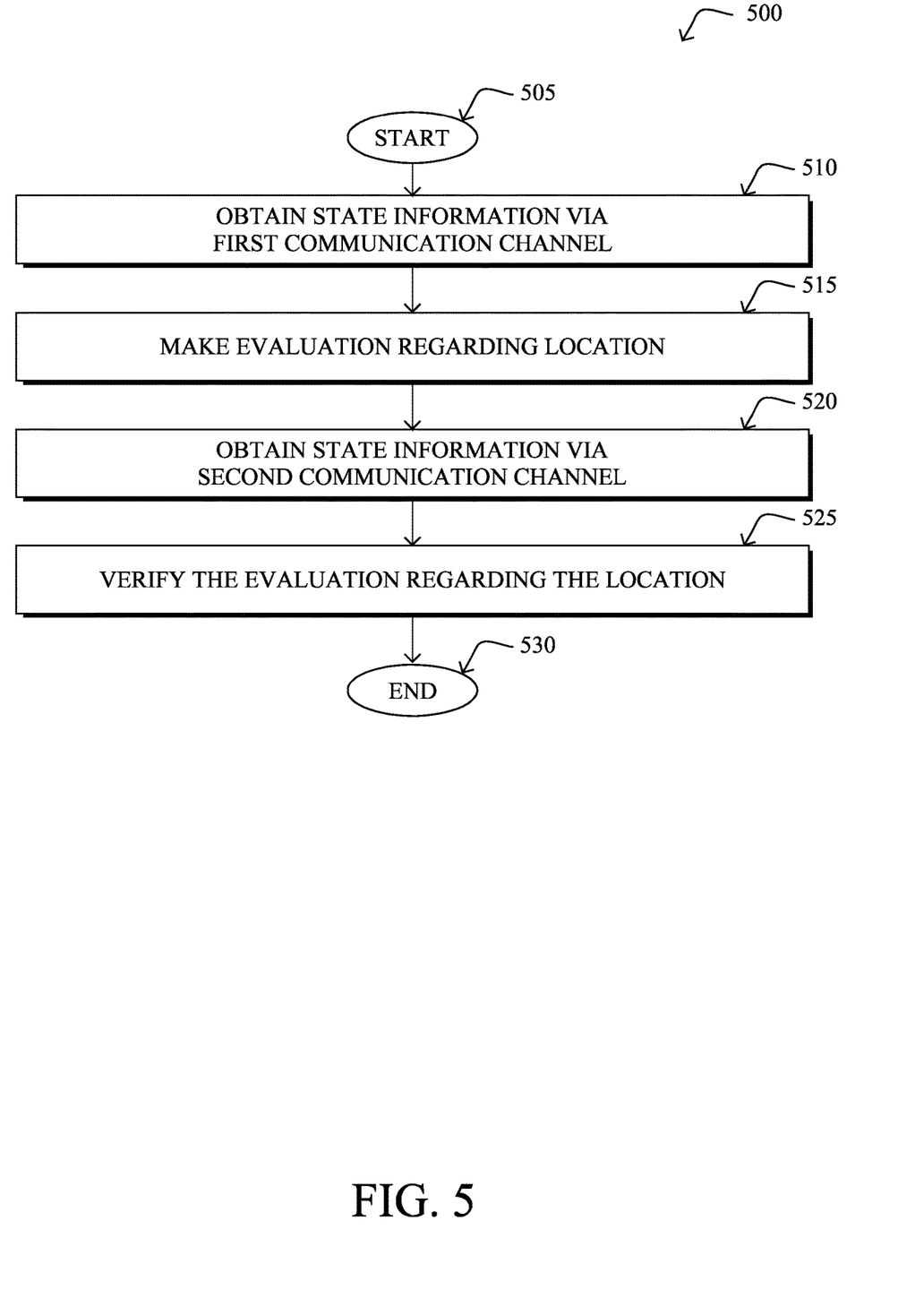
FIG. 5 illustrates an example simplified procedure for reliable observability in control towers based on side-channel queries.

FIG. 5 illustrates an example simplified procedure (e.g., a method) for reliable observability in control towers based on side-channel queries, in accordance with one or more embodiments described herein. For example, a non-generic, specifically configured device (e.g., device 200), may perform procedure 500 by executing stored instructions (e.g., control tower process 248). The procedure 500 may start at step 505, and continues to step 510, where, as described in greater detail above, a control tower device may obtain first state information from sensing or reporting systems or devices at a particular location via a first communication channel. In one embodiment, the particular location may comprise a seaport terminal, an airport, a transport vehicle, a warehouse, or a distribution center.

At step 515, as detailed above, the control tower device may make, based on the first state information, an evaluation regarding the particular location using one or more digital twins representing one or more entities of the particular location. Of note, the first state information may be a measurement by a sensor device that informs the one or more digital twins representing one or more entities of the particular location. The measurement may be of weight, time, humidity, or air pressure located within the particular location.

At step 520, the control tower device may obtain second state information from one or more trusted verifiers for the particular location via a second communication channel. In one embodiment, the one or more trusted verifiers for the particular location may comprise a local verifier device or a remote verifier device to the particular location. In one embodiment, the one or more trusted verifiers for the particular location may be selected at random by the control tower device. In one embodiment, the one or more trusted verifiers may comprise a sensor device configured to measure weight, time, humidity, or air pressure. In one embodiment, the second communication channel may be a side-channel to the first communication channel. In another embodiment, the first state information may be of a different type of data than the second state information At step 525, as detailed above, the control tower device may verify, based on the second state information, the evaluation regarding the particular location. In an embodiment, verifying the evaluation may comprise determining, by the control tower device, whether there is a consensus for the evaluation. In another embodiment, the control tower device may verify, based on information gathered by one or more other trusted verifiers, the second state information from the one or more trusted verifiers. In one embodiment, the control tower device may cause an indication of the evaluation to be displayed at a graphic user interface. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism to build, maintain, and retain trust of control tower systems, notably those that have incorporated digital twins. In particular, local verifier devices and remote verifier devices may both be queried, for example, via side-channels (i.e., over different communication and/or measurement methodologies than a supply chain uses) to obtain information regarding the supply chain. One or more consensus mechanisms may be applied to the information gathered by the devices to verify or determine whether information and/or data that is exposed to control tower systems (e.g., in the construction or updating of one or more digital twins) may be considered uncompromised and, therefore, "trusted" and relied upon. The techniques herein, therefore, increase the level of assurance and reliability of control tower systems.

While there have been shown and described illustrative embodiments that provide reliable observability in control towers based on side-channel queries, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of digital twins or queries are discussed herein, the techniques herein may be used in conjunction with any digital twins or queries.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, at a control tower device, first state information from sensing or reporting systems or devices at a particular location of a supply chain via a first communication channel;
    making, by the control tower device and based on the first state information, an evaluation regarding the particular location using one or more digital twins, wherein the one or more digital twins comprise a model that represents a state of the supply chain that has been constructed using supply chain specific data and context data obtained from sensors located across the supply chain and are automatically updated by information obtained from the control tower device;
    obtaining, by the control tower device, second state information from one or more trusted verifiers for the particular location via a second communication channel that is a side-channel to the first communication channel, at least one trusted verifier of the one or more trusted verifiers configured to use video analytics for processing video feeds to count a number of pallets present in the particular location; and
    verifying, by the control tower device and based on the second state information, the evaluation regarding the particular location in response to determining, by the control tower device, that there is a consensus for the evaluation, wherein verifying the evaluation is indicative of the state of the supply chain, as represented by the model of the one or more digital twins, being reliable.

2. The method as in claim 1, wherein the one or more trusted verifiers for the particular location comprise a local verifier device or a remote verifier device to the particular location.

3. The method as in claim 1, wherein the one or more trusted verifiers for the particular location is selected at random by the control tower device.

4. The method as in claim 1, wherein the one or more trusted verifiers comprise a sensor device configured to measure weight, time, humidity, or air pressure.

5. The method as in claim 1, wherein the particular location comprises a seaport terminal, an airport, a transport vehicle, a warehouse, or a distribution center.

6. The method as in claim 1, wherein the first state information is of a different type of data than the second state information.

7. The method as in claim 1, further comprising:
    verifying, by the control tower device and based on information gathered by one or more other trusted verifiers, the second state information from the one or more trusted verifiers.

8. The method as in claim 1, further comprising:
    causing, by the control tower device, an indication of the evaluation to be displayed at a graphic user interface.

9. An apparatus, comprising:
    one or more network interfaces;
    a processor coupled to the one or more network interfaces and configured to execute one or more processes; and
    a memory configured to store a process that is executable by the processor, the process when executed configured to:
        obtain first state information from sensing or reporting systems or devices at a particular location of a supply chain via a first communication channel;
        make, based on the first state information, an evaluation regarding the particular location using one or more digital twins, wherein the one or more digital twins comprise a model that represents a state of the supply chain that has been constructed using supply chain specific data and context data obtained from sensors located across the supply chain and is updated by information obtained from the apparatus;
        obtain second state information from one or more trusted verifiers for the particular location via a second communication channel that is a side-channel to the first communication channel, at least one trusted verifier of the one or more trusted verifiers configured to use video analytics for processing video feeds to count a number of pallets present in the particular location; and
        verify, based on the second state information, the evaluation regarding the particular location in response to determining, by the apparatus, that there is a consensus for the evaluation, wherein verifying the evaluation is indicative of the state of the supply chain, as represented by the model of the one or more digital twins, being reliable.

10. The apparatus as in claim 9, wherein the one or more trusted verifiers for the particular location comprise a local verifier device or a remote verifier device to the particular location.

11. The apparatus as in claim 9, wherein the one or more trusted verifiers for the particular location is selected at random.

12. The apparatus as in claim 9, wherein the one or more trusted verifiers comprise a sensor device configured to measure weight, time, humidity, or air pressure.

13. The apparatus as in claim 9, wherein the particular location comprises a seaport terminal, an airport, a transport vehicle, a warehouse, or a distribution center.

14. The apparatus as in claim 9, wherein the first state information is of a different type of data than the second state information.

15. The apparatus as in claim 9, wherein the process when executed is further configurable to:
- verify, based on information gathered by one or more other trusted verifiers, the second state information from the one or more trusted verifiers.

16. A tangible, non-transitory, computer-readable medium storing program instructions that cause a control tower device to execute a process comprising:
- obtaining, at the control tower device, first state information from sensing or reporting systems or devices at a particular location of a supply chain via a first communication channel that is a side-channel to the first communication channel;
- making, by the control tower device and based on the first state information, an evaluation regarding the particular location using one or more digital twins, wherein the one or more digital twins comprise a model that represents a state of the supply chain that has been constructed using supply chain specific data and context data obtained from sensors located across the supply chain and is updated by information obtained from the control tower device;
- obtaining, by the control tower device, second state information from one or more trusted verifiers for the particular location via a second communication channel, at least one trusted verifier of the one or more trusted verifiers configured to use video analytics for processing video feeds to count a number of pallets present in the particular location; and
- verifying, by the control tower device and based on the second state information, the evaluation regarding the particular location in response to determining, by the control tower device, that there is a consensus for the evaluation, wherein verifying the evaluation is indicative of the state of the supply chain, as represented by the model of the one or more digital twins, being reliable.

* * * * *